(12) United States Patent  
Krucinski et al.

(10) Patent No.: US 11,338,691 B2
(45) Date of Patent: May 24, 2022

(54) ELECTRIC VEHICLE CHARGING USING TIRE POSITIONS

(71) Applicant: ABB Schweiz AG, Baden (CH)

(72) Inventors: Martin Krucinski, Glastonbury, CT (US); Gregory A. Cole, West Hartford, CT (US); Harshang Shah, Bloomfield, CT (US)

(73) Assignee: ABB SCHWEIZ AG, Baden (CH)

( * ) Notice: Subject to any disclaimer, the term of this patent is extended or adjusted under 35 U.S.C. 154(b) by 255 days.

(21) Appl. No.: 16/578,541

(22) Filed: Sep. 23, 2019

(65) Prior Publication Data

US 2021/0086636 A1 Mar. 25, 2021

(51) Int. Cl.
| | |
|---|---|
| *H02J 7/00* | (2006.01) |
| *B60L 53/30* | (2019.01) |
| *B60L 53/16* | (2019.01) |
| *G01S 17/88* | (2006.01) |
| *B60L 53/65* | (2019.01) |
| *G01S 17/42* | (2006.01) |
| *G01S 17/04* | (2020.01) |

(52) U.S. Cl.
CPC ............. *B60L 53/30* (2019.02); *B60L 53/16* (2019.02); *B60L 53/305* (2019.02); *B60L 53/65* (2019.02); *G01S 17/04* (2020.01); *G01S 17/42* (2013.01); *G01S 17/88* (2013.01); *H02J 7/0045* (2013.01)

(58) Field of Classification Search
USPC .................................. 320/109, 110, 112, 114
See application file for complete search history.

(56) References Cited

U.S. PATENT DOCUMENTS

| | | |
|---|---|---|
| 6,157,162 A | 12/2000 | Hayashi et al. |
| 2005/0125117 A1 | 6/2005 | Breed |
| 2010/0235006 A1 | 9/2010 | Brown |
| 2013/0038284 A1 | 2/2013 | LaFrance |
| 2013/0076902 A1 | 3/2013 | Gao |
| 2014/0067660 A1 | 3/2014 | Cornish |
| 2014/0092236 A1 | 4/2014 | Findeisen et al. |
| 2016/0052414 A1 | 2/2016 | Bell et al. |
| 2017/0008411 A1 | 1/2017 | Wu |
| 2017/0136902 A1 | 5/2017 | Ricci |
| 2019/0084359 A1* | 3/2019 | Hassani ................. H04B 17/27 |

FOREIGN PATENT DOCUMENTS

| | | | |
|---|---|---|---|
| CN | 105888338 B | * | 5/2017 |
| CN | 208730818 U | * | 4/2019 |
| FR | 3066052 B1 | | 6/2019 |

OTHER PUBLICATIONS

International Searching Authority / US, International Search Report & Written Opinion issued in corresponding Application No. PCT/US2020/051022, dated Dec. 21, 2020, 10 pp.
Glenn, "Monitoring Temperatures of Tires Using Luminescent Materials," Tech Briefs, Feb. 1, 2006, retrieved Nov. 6, 2019 from the Internet: https://www.techbriefs.com/component/content/article/tb/techbriefs/physical-sciences/1593.

* cited by examiner

*Primary Examiner* — Brian Ngo
(74) *Attorney, Agent, or Firm* — Greenberg Traurig, LLP

(57) ABSTRACT

A charge head is connected to a charge inlet of an electric vehicle to supply an electric charge to recharge the battery of the vehicle. The charge head is attached to a connecting device that moves the charge head to the charge inlet. A sensor is provided to sense the locations of the tires of the vehicle. The system then uses the relative location of the charge inlet to the tires to determine the location of the charge inlet in order to move the charge head.

20 Claims, 4 Drawing Sheets

ELECTRIC VEHICLE CHARGING USING TIRE POSITIONS

BACKGROUND

The present inventions relate generally to electric vehicles, and more particularly, to moving a charge head of an electric power supply to a charge inlet of an electric vehicle.

Electric vehicles are growing in popularity. Unlike conventional combustion powered vehicles which are filled with a fluid fuel supply, electric vehicles must be connected to an electric supply to recharge an onboard battery. Since recharging of the battery must be done frequently (e.g., once a day), it would be desirable for the process of connecting the electric supply to the vehicle to be as easy and simple as possible. Therefore, the inventions are directed to improved automatic systems for connecting an electric supply to an electric vehicle.

SUMMARY

An automatic connection method is described for connecting a charge head to the charge inlet of an electric vehicle to recharge the battery of the vehicle. The method uses information about the vehicle to determine the location of the charge inlet relative to the tires. The method then senses the location of the tires to determine the location of the inlet. The charge head may then be moved to the charge inlet to make a connection to provide an electric charge to the charge inlet to charge the vehicle. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
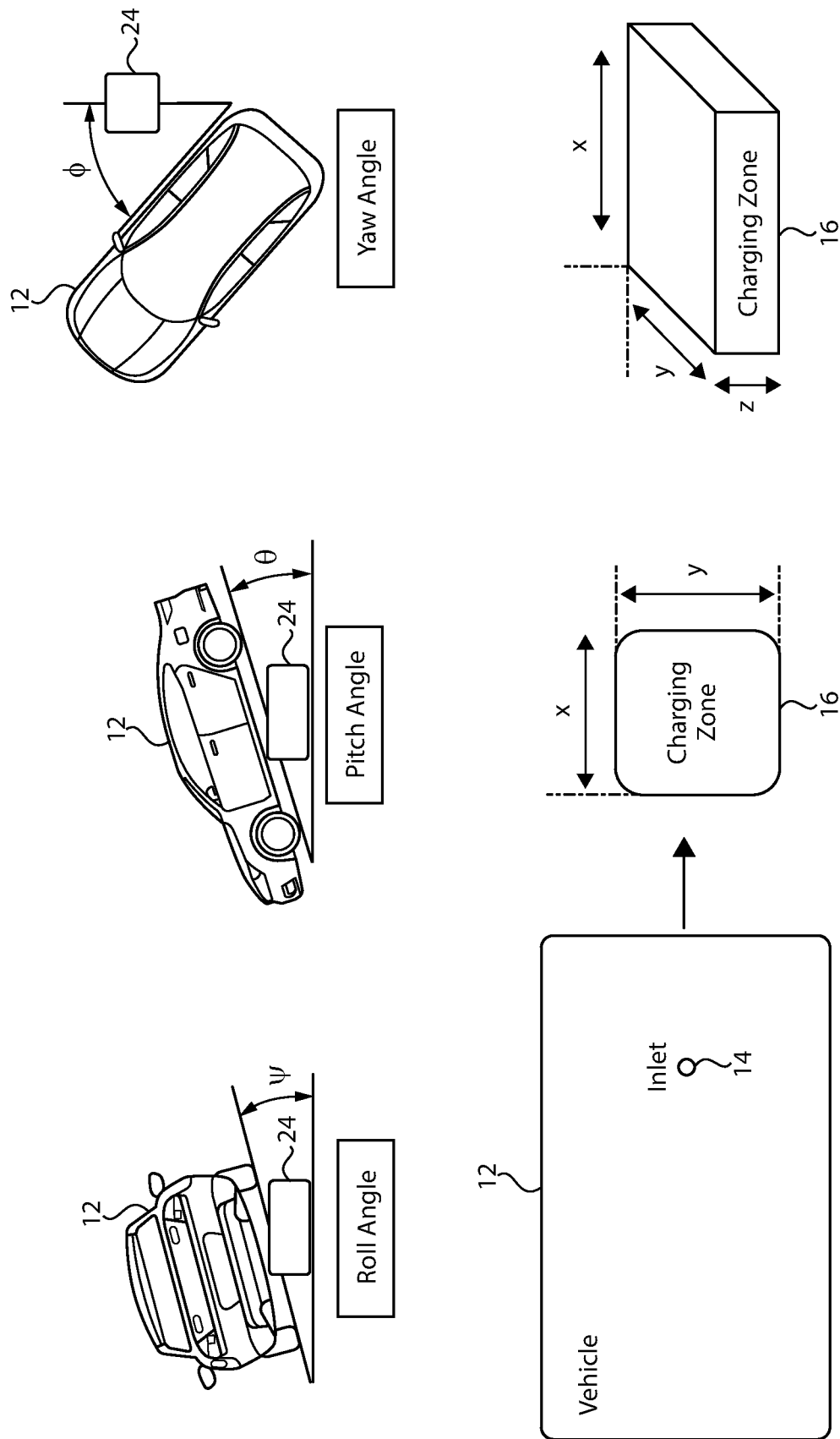
FIG. 1 is a schematic illustration of angles and positions of an electric vehicle relative to a charge zone.

Referring now to the figures, and particularly FIG. 1, the various angles and locations that may need to be considered when connecting an electric supply 10 to an electric vehicle 12 are shown. That is, when an electric vehicle 12 has been parked in a location intended for connecting the electric supply 10 to the vehicle 12, the angle and location of the vehicle 12 may vary in numerous ways that will change the location and orientation of the charge inlet 14 of the vehicle 12 relative to the automatic connection device 24. For example, FIG. 1 illustrates that the angle of the vehicle 12 may vary as shown by its roll angle $\psi$, pitch angle $\Theta$, and yaw angle $\phi$. Due to the parked position and type of vehicle 12, the location of the charge inlet 14 may also vary in a longitudinal direction x, lateral direction y, and vertical distance z. Thus, in an automatic connection system where the location of the vehicle 12 is uncontrolled, the location of the charge inlet 14 will be unknown to the automatic connection device 24. In order for the system to successfully connect automatically to the charge inlet 14 of the vehicle 12, the location of the charge inlet 14 must be determined within a narrow charging zone 16.

Figure 2:
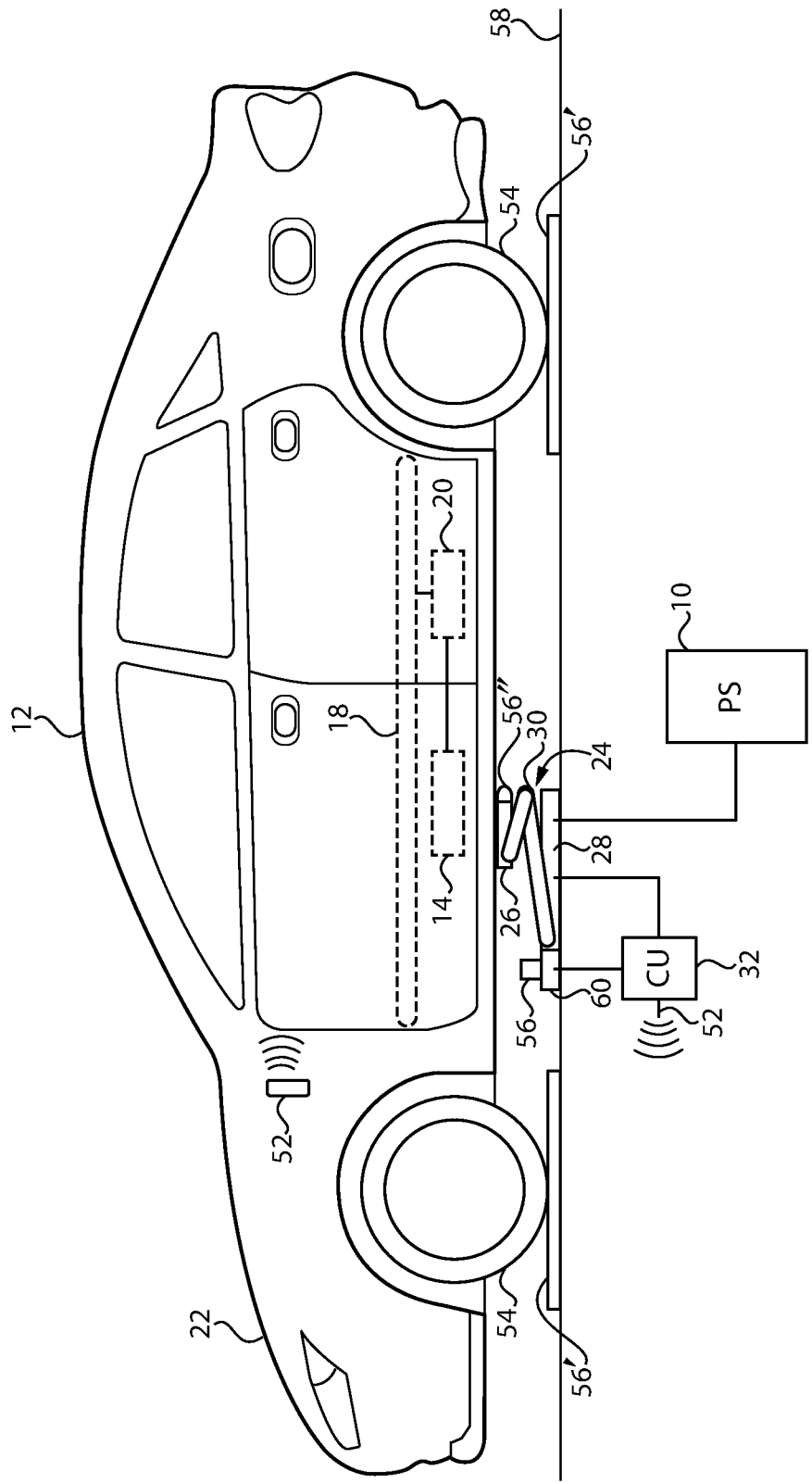
FIG. 2 is a schematic of an automatic connection system.

One embodiment of an automatic connection system is shown in FIG. 2. As is known, the electric vehicle 12 has a battery 18 that powers the vehicle 12 and requires periodic recharging. Typically, an onboard electric charger 20 is included on the vehicle 12 for charging the battery 18. The vehicle 12 also includes a charge inlet 14 for receiving an electric charge from an external power source 10. Although the charge inlet 14 may also be located on the side of the vehicle 12, in the preferred embodiment the charge inlet 14 is underneath the vehicle body 22.

The automatic connection system further includes a connection device 24 for connecting a charge head 26 to the charge inlet 14. Although the connection between the charge head 26 and the charge inlet 14 may be a non-contact connection (e.g., inductive), it is preferable for the connection between the charge head 26 and the charge inlet 14 to be a physical contact. For example, the charge inlet 14 or charge head 26 could have one or more conductive pins, and the other could have one or more corresponding conductive sockets that engage with the pins. Thus, when physically contacting each other, an electric charge from an external power supply 10 flows through the charge head 26 and charge inlet 14 to supply a charge to the onboard charger 20 and battery 18 to recharge the vehicle 12.

The charge head 26 is preferably connected to a base 28 that rests on or is attached to the floor 58 or other non-movable structure. A powered linkage 30 is provided between the base 28 and the charge head 26 to allow the charge head 26 to move relative to the base 28 in order to connect the charge head 26 and the charge inlet 14 together. It is understood that the linkage 30 shown in the drawings is only illustrative, and many types of linkages 30 are possible. Preferably, the linkage 30 is able to move in the longitudinal direction x, lateral direction y, and vertical distance z. Such movement may involve the rotation and linear motion of linkage components in various directions. Movement of the linkage 30 and the charge head 26 is automatically controlled by a control unit 32.

Figure 3:
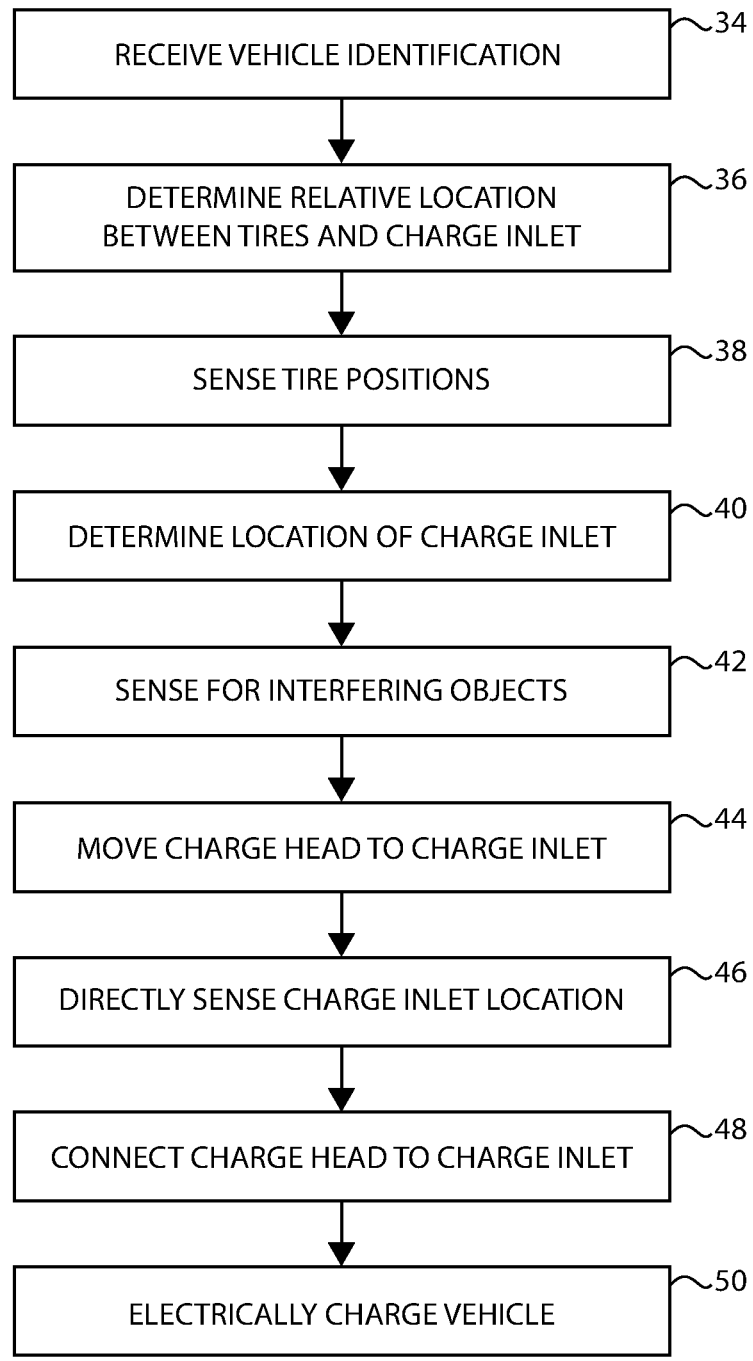
FIG. 3 is a flow chart of an automatic connection method.

Turning to FIG. 3, a method for automatically connecting an electric power supply 10 to an electric vehicle 12 is shown. In the first step, vehicle information, such as vehicle identification information, is acquired by the connection device 24 (34). The vehicle information may include vehicle model information which may be used to refer to a database for specific physical information, or the vehicle information may be physical information about the vehicle 12 directly communicated by the vehicle 12. Although the vehicle information may be acquired in various known ways, it is preferable for the electric vehicle 12 and the connection device 24 to wirelessly communicate information with antennas 52 prior to the charge head 26 moving to connect to the charge inlet 14.

The connection device 24 then determines the location of the charge inlet 14 relative to the vehicle tires 54 either directly from physical vehicle information communicated by the vehicle 12 or indirectly calculated or looked up based on model information provided in the vehicle information (36). The connection device 24 then senses the position of one or more tires 54 of the vehicle 12 (38). Typically, the position of the tires 54 will be sensed by a sensor 56 located below the body 22 of the vehicle 12. Although it may be possible to sufficiently determine the position of the vehicle 12 using the location of less than all of the tires 54 of the vehicle 12, it is preferred for the position of all four tires 54 to be sensed. Where the sensor 56 reads a distance between the sensor 56 and the tire 54, it is preferable for the sensor 56 to be positioned in a location where a viewing angle of all four tires 54 is possible. Sensing of the tire 54 positions may be done with a number of different sensors 56, such as time of flight (ToF) sensors 56, LIDAR sensors 56, ultrasonic sensors 56 or luminescence sensors 56. LIDAR sensors that may be used include time of flight (ToF) sensors 56, line scan LIDAR sensors 56 (i.e., that provide sensor data along a line as opposed to a point as in ToF sensors), two-dimensional scan LIDAR sensors 56 (i.e., provide planar sensor data). A pressure mat 56' between the floor 58 and the tires 54 may also be used to sense the position of the tires 54 if desired.

Figure 4:
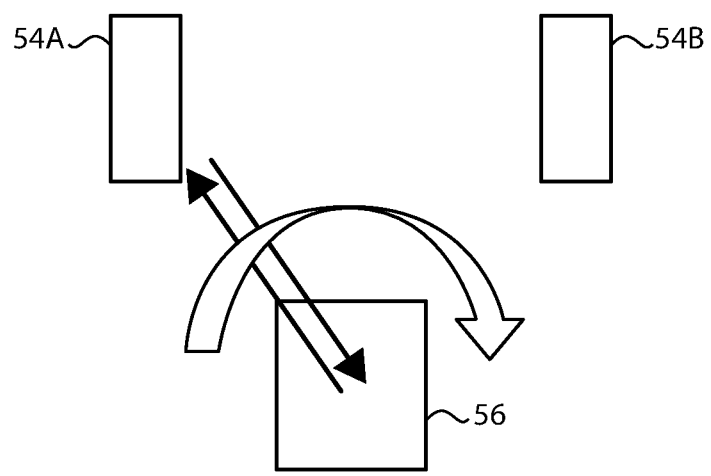
FIG. 4 is a schematic of a sensor sensing the position of the tires of a vehicle.
Figure 4:
Figure 5:
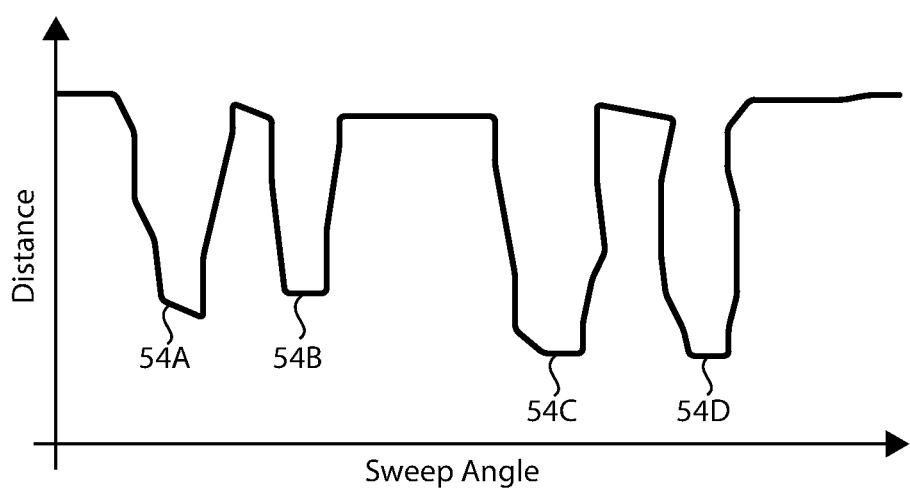
FIG. 5 is a chart showing distances from a position sensor to objects in its surrounding area.

For example, as illustrated in FIG. 4, an inexpensive time of flight (ToF) LIDAR sensor 56 may be used to sense the positions of the tires 54 in one embodiment. As is understood, time of flight (ToF) LIDAR sensors 56 use a laser to read a bounce back signal to determine the distance of a single point at a time. As shown in FIGS. 4-5, in order to sense the positions of all of the tires 54, the time of flight (ToF) sensor 56 may be swept 360° around with an electric stepper motor 60 (see also FIG. 2). In this arrangement, it may be desirable for the sensor 56 to be located underneath the vehicle 12 in between all of the tires 54 as shown in FIG. 4. As illustrated in FIG. 5, it can be seen that the first and second tires 54A, 54B (e.g., front tires) are further away from the sensor 56 than the third and fourth tires 54C, 54D (e.g., the rear tires). Thus, the longitudinal position of the vehicle 12 can be determined. Further, it can be seen that the first and fourth tires 54A, 54D (e.g., left tires) are slightly closer to the sensor 56 relative to the second and third tires 54B, 54C (e.g., right tires). Thus, the lateral position of the vehicle 12 can also be determined. The yaw angle φ of the vehicle 12 may be similarly determined if desired.

Turning back to FIG. 3, once the connecting device 24 senses the location of the tires 54, the control unit 32 determines the location of the charge inlet 14 using the tire 54 positions and the relative location determined between the charge inlet 14 and the tires 54 (40). In some embodiments, it may be useful to sense other objects with the position sensor 56 in addition to the tires 54. For example, the sensor 56 may also sense the presence of objects that would interfere with the movement of the connecting device 24 to the charge inlet 14 (42). In this context, a human that is in the way and who could be hit by the connecting device 24 could be considered to be an interfering object. In order to prevent damage to the interfering object (e.g., person) or to the connecting device 24, the control unit 32 may have a safety routine that prevents the charge head 26 from being moved to the charge inlet 14 when an interfering object is identified by the position sensor 56.

After the location of the charge inlet 14 has been determined, the connecting device 24 may move the charge head 26 to the charge inlet 14 with the linkage 30 (44). It is understood that the location determination of the charge inlet 14 described above based on the positions of the tires 54 and the relative location of the charge inlet 14 and the tires 54 may not be precise enough to allow a final connection between the charge head 26 and the charge inlet 14. That is, while such positioning may be useful in moving the charge head 26 to within a few inches of the needed connection location, a precision of a fraction of an inch may be necessary to achieve successful connection of the charge head 26 and the charge inlet 14, especially where a physical contact is used. In this case, it may be desirable for the position of the charge inlet 14 to be directly sensed by the charge head 26 after moving the charge head 26 near the charge inlet 14 and before actually connecting with the charge inlet 14 (46). This may be done with the same position sensor 56 used to sense the position of the tires 54 or may be done with a different sensor 56" on the charge head 26. The charge head 26 may then be connected to the charge inlet 14 (48) to permit electric charge from the external power supply 10 to charge the battery 18 of the vehicle 12 (50).

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method, comprising:
   receiving vehicle information about an electric vehicle to be electrically charged;
   determining, from the vehicle information, a relative location between a charge inlet on the electric vehicle and a plurality of tires of the electric vehicle;
   sensing a position of one of the plurality of tires;
   determining a location of the charge inlet from the position of each of the plurality of tires and the relative location between the charge inlet and the plurality of tires;
   sensing whether an object is disposed between the charge inlet a charge head; and
   moving the charge head to the location of the charge inlet to electrically charge the electric vehicle in response to determining no object is disposed between the charge inlet and the charge head via a safety routine, or preventing the charge head from moving to the location of the charge inlet in response to determining the object is disposed between the charge inlet and the charge head.

2. The method according to claim 1, wherein the vehicle information is vehicle identification information wirelessly transmitted by the electric vehicle.

3. The method according to claim 1, wherein a time of flight (ToF) sensor is used to sense the position of one of the plurality of tires, the time of flight (ToF) sensor reading a distance of a single point at a time, the time of flight (ToF) sensor being rotated with an electric motor to scan an area around the time of flight (ToF) sensor to sense the position of each of the plurality of tires.

4. The method according to claim 1, wherein a LIDAR sensor is used to sense the position of the one of the plurality of tires.

5. The method according to claim 4, wherein the LIDAR sensor is a time of flight (ToF) sensor.

6. The method according to claim 4, wherein the LIDAR sensor is a line scan LIDAR sensor.

7. The method according to claim 4, wherein the LIDAR sensor is a two-dimensional scan LIDAR sensor.

8. The method according to claim 1, wherein a pressure sensitive mat disposed between a floor and the one of the plurality of tires is used to sense the position of the one of the plurality of tires.

9. The method according to claim 1, wherein an ultrasonic sensor is used to sense the position of the one of the plurality of tires.

10. The method according to claim 1, wherein a luminescence sensor is used to sense the position of the one of the plurality of tires.

11. The method according to claim 1, wherein the charge head physically contacts the charge inlet to electrically charge the electric vehicle.

12. The method according to claim 11, further comprising directly sensing the location of the charge inlet after moving the charge head to the location of the charge inlet and before physically contacting the charge inlet.

13. The method according to claim 1, further comprising sensing a position of each of the plurality of tires.

14. The method according to claim 13, wherein the position of each of the plurality of tires is sensed with a sensor disposed below a body of the vehicle.

15. The method according to claim 14, wherein the sensor is disposed within a viewing angle of four tires of the vehicle.

16. The method according to claim 15, wherein the sensor is disposed in between each of the four tires of the vehicle.

17. The method according to claim 1, further comprising sensing a position of each of the plurality of tires, wherein a sensor is used to sense the position of each of the plurality of tires, the sensor being a time of flight (ToF) sensor, a LIDAR sensor, an ultrasonic sensor or a luminescence sensor, the position of each of the plurality of tires is sensed with the sensor disposed below a body of the vehicle, the sensor being disposed within a viewing angle of four tires of the vehicle.

18. The method according to claim 17, wherein the sensor is disposed in between each of the four tires of the vehicle.

19. The method according to claim 18, wherein the vehicle information is vehicle identification information wirelessly transmitted by the electric vehicle, the charge head physically contacts the charge inlet to electrically charge the electric vehicle, and further comprising directly sensing the location of the charge inlet after moving the charge head to the location of the charge inlet and before physically contacting the charge inlet.

20. A method of locating a charge inlet on an electric vehicle, comprising:
  receiving vehicle information about the electric vehicle to be electrically charged;
  determining, from the vehicle information, a relative location between the charge inlet and a plurality of tires of the electric vehicle;
  sensing a position of one of the plurality of tires;
  determining a location of the charge inlet from the position of each of the plurality of tires and the relative location between the charge inlet and the plurality of tires; and
  moving a charge head to the location of the charge inlet to electrically charge the electric vehicle,
  wherein a time of flight (ToF) sensor is used to sense the position of one of the plurality of tires, the time of flight (ToF) sensor reading a distance of a single point at a time, the time of flight (ToF) sensor being rotated with an electric motor to scan an area around the time of flight (ToF) sensor to sense the position of each of the plurality of tires.

* * * * *